3,592,828
Patented July 13, 1971

3,592,828
17α-(1′,3′-ALKADIYNYL)-17β-HYDROXY (17β-ALKOXY)-STEROIDS
Colin Michael Burgess, Peter Feather, and Vladimir Petrow, London, England, assignors to The British Drug Houses Limited
No Drawing. Filed Feb. 27, 1968, Ser. No. 708,526
Claims priority, application Great Britain, Mar. 16, 1967, 12,301/67
Int. Cl. C07c *169/20*
U.S. Cl. 260—397.5        12 Claims

ABSTRACT OF THE DISCLOSURE

17α - (1′,3′ - alkadiynyl)-3β,17β-dihydroxy-4-androstenes and 17α-(1′,3′-alkadiynyl)-3β,17β-dihydroxy-4-oestrenes together with 3β-esters and 17β-alkylethers thereof are provided. These compounds are useful in the treatment of conditions and defects of the reproductive systems and for the limitation or enhancement of fertility.

---

This invention is for improvements in or relating to organic compounds and has particular reference to 17α-(1′,3′-alkadiynyl)-17β-hydroxy (17β-alkoxy)-steroids.

It is an object of the present invention to provide novel 17α(1′,3′ - alkadiynyl) - 3β,17β-dihydroxy-4-androstenes and 17α-(1′,3′-alkadiynyl)-3β,17β-dihydroxy-4-oestrenes, together with 3β-esters and 17β-alkyl ethers thereof having, apart from optional additional substituents and unsaturated linkages the structural formula

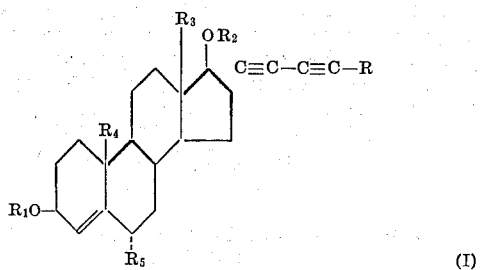

(I)

where R is an alkyl group containing not more than 5 carbon atoms, $R_1$ is H or an acyl, cyclic acyl or aroyl group containing not more than 12 carbon atoms, $R_2$ is H, Me or Et, $R_3$ is Me or Et, $R_4$ is H or Me and $R_5$ is H or Me.

The new compounds of the present invention are of value in the art on account of their hormonal and anti-hormonal properties including oestrogenic, progestational, claudogenic, ovulation-inhibiting and gonadotrophin-inhibiting properties. Thus, the compounds are of value in preparations for the treatment of a wide range of conditions and defects of the reproductive system and for the limitation or enhancement of fertility. The new steroids may be administered in standard pharmaceutical and veterinary forms, such for example as tablets, injections, vaginal sponges and tampons.

The present invention provides the following specific substituted 17α-(1′,3′-alkadiynyl)-17β-hydroxy (17β-alkoxy)-steroids:

17α-(1′,3′-pentadiynyl)-4-oestrene-3β,17β-diol
17α-(1′,3′-hexadiynyl)-4-oestrene-3β,17β-diol, which compound has shown activity when administered orally in the rat claudogen test
17α-(1′,3′-heptadiynyl)-4-oestrene-3β,17β-diol
17α-(1′,3′-hexadiynyl)-4-androstene-3β,17β-diol
3β-acetoxy-17α-(1′,3′-hexadiynyl)-4-oestren-17β-ol
17α-(1′,3′-hexadiynyl)-6α-methyl-4-androstene-3β,17β-diol
17α-(1′,3′-hexadiynyl)-3β-(3″-phenyl-propionoxy)-4-oestren-17β-ol
17α-(1′,3′-hexadiynyl)-3β-hexanoyloxy-4-oestren-17β-ol
3β-[(1′-adamantyl)-acetoxy]-17α-(1″,3″-hexadiynyl)-4-oestren-17β-ol
17α-(1′,3′-hexadiynyl)-3β-propionoxy-4-oestren-17β-ol
17α-(1′,3′-hexadiynyl)-3β-hydroxy-17β-methoxy-4-oestrene.

According to the present invention there is also provided a process for the preparation of 17α-(1′,3′-alkadiynyl)-3β,17β-dihydroxy-4-androstenes and 17α-(1′,3′-alkadiynyl)-3β,17β-dihydroxy-4-oestrenes and 3β-esters and 17β-alkyl ethers thereof having, apart from optional additional unsaturated linkages and groups the structural formula (I) above, where R, R′, R″ and R‴ have the same meaning as above which process comprises reducing the corresponding 3-keto steroid and, if desired, acylating the resulting 3β-hydroxy-Δ⁴-steroid.

New steroids provided by the present invention may, in addition to the aforementioned 17α-alkadiynyl, 17β-hydroxy(17β-alkoxy) and 3β-hydroxy (or derived ester) groups and the unsaturated linkage at $C_4$, optionally contain unsaturated linkages at $C_1$, $C_6$, $C_7$, $C_8$, $C_{8(14)}$, $C_9$, $C_{9(11)}$, $C_{11}$ or $C_{14}$, methyl groups at $C_1$, $C_6$ or $C_7$, hydroxy groups at $C_1$, $C_6$, $C_7$, $C_{11}$ or $C_{12}$, or combinations of two or more such unsaturated linkages and/or groups. $C_{10}$ may be linked to a hydrogen atom or a methyl group.

Steroidal starting-materials suitable for the preparation of the compounds of the present invention are the 17α-(1′,3′ - alkadiynyl)-17β-hydroxy(17β-alkoxy)-derivatives of 4-androsten-3-ones and 4-oestren-3-ones, described in our co-pending applications Nos. 559,737 filed June 23, 1966, now Pat. No. 3,463,796, and 576,866 filed Sept. 2, 1966, now Pat. No. 3,442,918. These steroidal 4-en-3-ones are converted into the corresponding steroidal 3β-alcohols of the present invention by reduction. Suitable reducing agents which may be employed are, for example, lithium aluminium hydride, sodium borohydride or lithium-tri-t-butoxyaluminohydride. The preferred reducing agent is lithium-tri-t-butoxyaluminohydride (conveniently made in situ from lithium aluminium hydride in anhydrous t-butanol and anhydrous tetrahydrofuran as solvent) which affords the most favourable yield of the steroidal 3β-alcohol.

As will be apparent to those skilled in the art, 3β-hydroxy-steroids may be converted into 3β-acyloxy-, 3β-cyclic-acyloxy- and 3β-aroyloxy-steroids by reaction under suitable conditions with esterifying agents such as acid anhydrides and acid chlorides.

Following is a description by way of example of methods of carrying the invention into effect.

EXAMPLE 1

17α-(1′,3′-hexadiynyl)-4-oestrene-3β,17β-diol

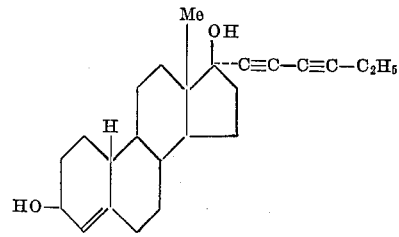

Anhydrous t-butanol (5.25 g.) was added dropwise to a stirred suspension of lithium aluminium hydride (0.90 g.) in anhydrous tetrahydrofuran (80 ml.). The mixture was cooled to 0° C. 17α-(1′-3′-hexadiynyl)-4-oestren-17β-ol-3-one (2.0 g.) was added and the mixture was stirred at 0° C. for 2 hours and for 2½ hours at room temperature. Dilute sulphuric acid (1.2 ml.; 10%) was added dropwise and the mixture was filtered. The filtrate was poured into brine and the resulting precipitate was collected and purified by crystallisation from acetone/hexane, affording 17α-(1′,3′-hexadiynyl)-4-oestrene-3β,17β - diol, M.P. 175° C., [α]$_D^{24}$—74° (c., 0.93 in dioxan).

EXAMPLE 2

3β-acetoxy-17α-(1′,3′-hexadiynyl)-4-oestren-17β-ol

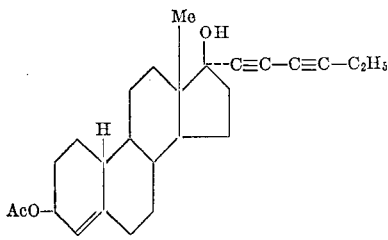

A solution of 17α-(1′,3′-hexadiynyl)-4-oestrene-3β,17β-diol (0.50 g.) in a mixture of pyridine (2.0 ml.) and acetic anhydride (2.0 ml.) was allowed to stand at room temperature for 3 hours and poured into water. The precipitate was collected and purified by crystallisation from petroleum ether (B.P. 80–100° C.) and from aqueous methanol, affording 3β-acetoxy-17α-(1′,3′-hexadiynyl)-4-oestren-17β-ol, M.P. 123° C., [α]$_D^{24}$—102.5° (c., 0.73 in EtOH).

EXAMPLE 3

17α-(1′,3′-hexadiynyl)-4-androstene-3β,17β-diol

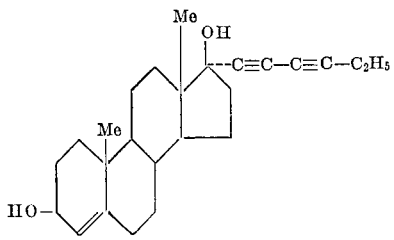

Anhydrous t-butanol (18.0 ml.) was added dropwise to a stirred suspension of lithium aluminium hydride (2.41 g.) in anhydrous tetrahydrofuran (60 ml.). The mixture was cooled to 0° C. 17α-(1′,3′-hexadiynyl)-4-androsten-17β-ol-3-one (5.36 g.) in anhydrous tetrahydrofuran (60 ml.) was added and the mixture was stirred at 0° C. for 2 hours and at room temperature for 2½ hours. Dilute sulphuric acid (3.25 ml.; 10%) was added dropwise and the mixture was filtered. The filtrate was poured into brine and the resulting precipitate was collected and purified by crystallisation from acetone/hexane, thin-layer chromatography on silica-gel eluting with toluene/ethyl acetate, and by crystallisation from ether/hexane, affording 17α-(1′,3′-hexadiynyl)-4-androstene-3β-17β-diol, M.P. 145° C., [α]$_D^{24}$—67° (c., 0.44 in EtOH).

EXAMPLE 4

17α-(1′,3′-heptadiynyl)-4-oestrene-3β,17β-diol

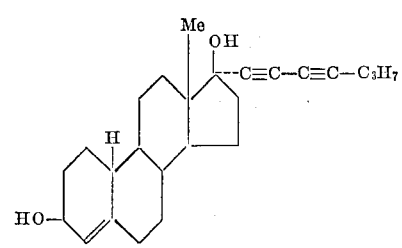

Anhydrous t-butanol (6.8 ml.) was added dropwise to a stirred suspension of lithium aluminium hydride (0.90 g.) in anhydrous tetrahydrofuran (60 ml.). The mixture was cooled to 0° C. (17α-(1′,3′-heptadiynyl)-4-oestren-17β-ol-3-one (2.0 g.) in anhydrous tetrahydrofuran (22.5 ml.) was added and the mixture was stirred at 0° C. for 2 hours and at room temperature for 2½ hours. Dilute sulphuric acid (1.25 ml.; 10%) was added dropwise and the mixture was filtered. The filtrate was poured into brine and the steroidal product was recovered by extraction with ether and purified by crystallisation from ether/petroleum ether, affording 17α-(1′,3′-heptadiynyl)-4-oestrene-3β,17β-diol, M.P. 129° C., [α]$_D^{25}$—68° (c., 0.9 in dioxan containing 0.4% of pyridine).

EXAMPLE 5

17α-(1′,3′-pentadiynyl)-4-oestrene-3β,17β-diol

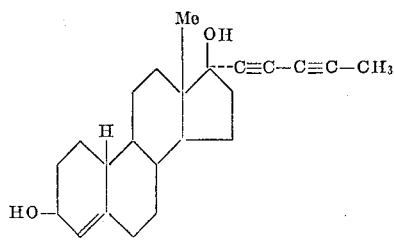

Anhydrous t-butanol (7.12 g.) was added dropwise to a stirred suspension of lithium aluminium hydride (1.22 g.) in anhydrous tetrahydrofuran (110 ml.). The mixture was cooled to 0° C. 17α-(1′,3′-pentadiynyl)-4-oestren-17β-ol-3-one (2.6 g.) in anhydrous tetrahydrofuran (30 ml.) was added and the mixture was stirred for 2 hours at 0° C. and for 2½ hours at room temperature. Dilute sulphuric acid (1.6 ml.; 10%) was added dropwise and the mixture was filtered. The filtrate was poured into brine and the steroidal product was recovered by extraction with ether and purified by crystallisation from acetone/hexane, affording 17α-(1′,3′-pentadiynyl)-4-oestrene-3β,17β-diol. M.P. 161° C., [α]$_D^{26}$—62° (c., 0.43 in dioxan containing 0.4% of pyridine).

EXAMPLE 6

17α-(1′,3′-hexadiynyl)-6α-methyl-4-androstene-3β,17β-diol

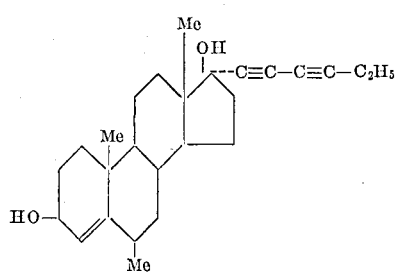

Anhydrous t-butanol (9.70 g.) was added dropwise to a stirred suspension of lithium aluminium hydride (1.67 g.) in anhydrous tetrahydrofuran (150 ml.). The mixture was cooled to 0° C. 17α-(1′,3′-hexadiynyl)-6α-methyl-4-androsten-17β-ol-3-one (4.0 g.) was added and the mixture was stirred at 0° C. for 1½ hours and at room temperature for 1¾ hours. Dilute sulphuric acid (2.2 g.; 10%) was added dropwise and the mixture was filtered. The filtrate was poured into brine and the steroidal product was collected and purified by crystallisation from acetone, affording 17α-(1′,3′-hexadiynyl)-6α-methyl-4-androstene-3β,17β-diol, M.P. 168° C., [α]$_D^{24}$—33° (c., 0.2 in dioxan containing 0.4% of pyridine).

EXAMPLE 7

17α-1′,3′-hexadiynyl)-3β-(3″-phenyl-propionoxy)-4-oestren-17β-ol

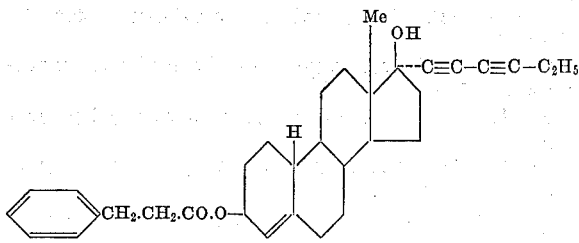

3-phenyl-propionyl chloride (1.0 ml.) was added dropwise to a stirred solution of 17α-(1′,3′-hexadiynyl)-4-oestrene-3β,17β-diol (0.50 g.) in anhydrous pyridine (10 ml.) at −20° to −10° C. The solution was stirred at this temperature for 30 minutes and at room temperature for 2 hours, and poured onto ice. The steroidal product was collected, dried, and purified by chromatography on neutral alumina, eluting with toluene, giving amorphous 17α-(1′,3′-hexadiynyl)-3β-(3″-phenyl - propionoxy)-4-oestren-17β-ol, $[\alpha]_D^{23}$ −73° (c., 0.53 in dioxan containing 0.2% of pyridine), $\nu_{max.}^{CCl_4}$ 3612, 2250, 1730, 1451 cm.$^{-1}$, $\nu_{max.}^{CS_2}$ 1029, 698 cm.$^{-1}$ The compound gave a single spot when examined by thin-layer chromatography.

EXAMPLE 8

17α-(1′,3′-hexadiynyl)-3β-hexanoyloxy-4-oestren-17β-ol

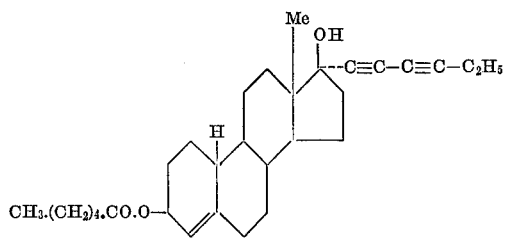

A solution of 17α-(1′,3′-hexadiynyl)-4-oestrene-3β,17β-diol (0.50 g.) in a mixture of pyridine (15 ml.) and hexanoic anhydride (2.5 ml.) was maintained at 40° C. for 9 hours. The mixture was poured onto ice, and the steroidal product was isolated by extraction with a mixture of equal volumes of ether and ethyl acetate. Purification by chromatography on neutral alumina, eluting with toluene, gave amorphous 17α-(1′,3′-hexadiynyl)-3β-hexanoyloxy-4-oestren-17β-ol, $[\alpha]_D^{22}$ −63° (c., 0.25 in EtOH), $\nu_{max.}^{CCl_4}$ 3610, 2250, 1729, 1451 cm.$^{-1}$, $\nu_{max.}^{CS_2}$ 1169, 1030 cm.$^{-1}$ The compound gave a single spot when examined by thin-layer chromatography.

EXAMPLE 9

3β-[(1′-adamantyl)-acetoxy]-17α-(1″,3″-hexadiynyl)-4-oestren-17β-ol

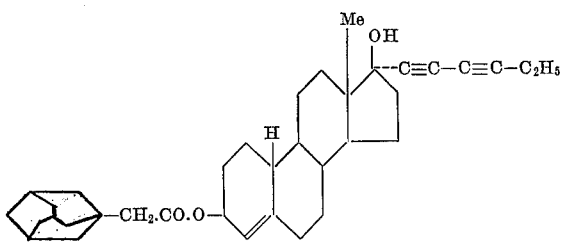

A mixture of 17α-(1′,3′-hexadiynyl)-4-oestrene-3β,17β-diol (0.25 g.), pyridine (10 ml.) and (1-adamantyl)-acetic anhydride (0.50 g.) was heated on the steam-bath for 20 hours. The mixture was allowed to cool and poured onto ice. The steroidal product was isolated by extraction with ether and purified by thin-layer chromatography, giving amorphous 3β-[(1′-adamantyl)-acetoxy]-(1″,3″-hexadiynyl)-4-oestren-17β-ol, $[\alpha]_D^{23}$ −71° (c., 0.26 in EtOH), $\nu_{max.}^{CCl_4}$ 3610, 2250, 1725 cm.$^{-1}$, $\nu_{max.}^{CS_2}$ 1253, 1132, 1001 cm.$^{-1}$ The compound gave a single spot when examined by thin-layer chromatography.

EXAMPLE 10

17α-(1′,3′-hexadiynyl)-3β-propionoxy-4-oestren-17β-ol

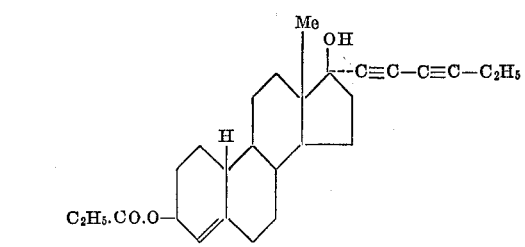

A solution of 17α-(1′,3′-hexadiynyl)-4-oestrene-3β,17β-diol (0.50 g.) in a mixture of pyridine (2.0 ml.) and propionic anhydride (2.4 ml.) was allowed to stand overnight at room temperature, and poured into water. The precipitate was collected and purified by crystallisation from aqueous methanol, affording 17α-(1′,3′-hexadiynyl)-3β - propionoxy - 4 - oestren - 17β - ol, M.P. 73° C., $[\alpha]_D^{19}$ −107° (c., 0.36 in dioxan containing 0.2% of pyridine).

EXAMPLE 11

17α-(1′,3′-hexadiynyl)-3β-hydroxy-17β-methoxy-4-oestrene

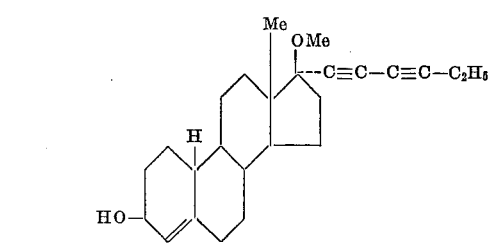

A solution of 17α-(1′,3′-hexadiynyl)-3-methoxy-2,5-(10)-oestradien-17β-ol (Example 34 of United States Pat. No. 3,442,918) (6.6 gm.) in anhydrous tetrahydrofuran (180 ml.) was added dropwise during fifteen minutes, to stirred sodamide (from 0.62 gm. of sodium and a trace of ferric nitrate) in liquid ammonia (200 ml.) at about −60° C. The mixture was stirred for 10 minutes, methyl iodide (4.0 g.) in tetrahydrofuran (10 ml.) was added, and the mixture was stirred at about −60° C. for two hours and poured onto ice. The steroidal product was isolated by extraction with ether and treated in methanol (250 ml.) with 3 N aqueous hydrochloric acid (120 ml.) for fifteen minutes at 60° C. The methanolic solution was cooled, and poured into ice-water. The steroidal product, isolated by extraction with ether, was purified by chromatography on alumina, eluting with toluene, giving 17α-(1′,3′-hexadiynyl)-17β-methoxy-4-oestren-3-one, $\lambda_{max.}^{EtOH}$ 240 mμ (ϵ, 16300)

The foregoing compound (2.8 gm.) in anhydrous tetrahydrofuran (30 ml.) was aded to a stirred solution prepared from lithium aluminium hydride (1.20 gm.) and anhydrous t-butanol (9.0 ml.) in tetrahydrofuran (30 ml.) at 0° C. The mixture was stirred at this temperature for 2 hours and at room temperature for 2 hours. Water (5 ml.) was added. The mixture was filtered and the filtrade was poured into brine. The steroidal product was isolated by extraction with ether and purified by chromatography on neutral alumina, eluting with toluene, giving amorphous 17α - (1',3' - hexadiynyl)-3β-hydroxy-17β-methoxy-4-oestrene, [α]$_D^{23}$—94° (c., 1.00 in dioxan), $\nu_{max.}^{CCl_4}$ 3615, 2245, 1660 cm.$^{-1}$ $\nu_{max.}^{CS_2}$ 1372, 1261, 1093, 1024 cm.$^{-1}$ The compound gave a single spot when examined by thin-layer chromatography.

We claim:

1. A compound of the formula:

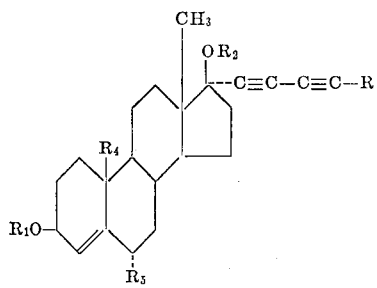

wherein R is alkyl of not more than 5 carbon atoms, R$_1$ is hydrogen or an acyl, cyclic acyl or aroyl group containing not more than 12 carbon atoms, R$_2$ is hydrogen, methyl or ethyl, R$_4$ is hydrogen or methyl, and R$_5$ is hydrogen or methyl.

2. 17α-(1',3'-pentadiynyl)-4-oestrene-3β,17β-diol.
3. 17α-(1',3'-hexadiynyl)-4-oestrene-3β,17β-diol.
4. 17α-(1',3'-heptadiynyl)-4-oestrene-3β,17β-diol.
5. 17α-(1',3'-hexadiynyl)-4-androstene-3β,17β-diol.
6. 3β - acetoxy - 17α - (1',3' - hexadiynyl) - 4 - oestren-17β-ol.
7. 17α - (1',3'-hexadiynyl)-6α-methyl-4-androstene-3β,17β-diol.
8. 17α - (1',3'-hexadiynyl)-3β-(3''-phenylpropionoxy)-4-oestren-17β-ol.
9. 17α - (1',3' - hexadiynyl)-3β-hexanoyloxy-4-oestren-17β-ol.
10. 3β - [(1' - adamantyl) - acetoxy]-17α-(1'',3''-hexadiynyl)-4-oestren-17β-ol.
11. 17α - (1',3' - hexadiynyl)-3β-propionoxy-4-oestren-17β-ol.
12. 17α - (1',3'-hexadiynyl)-3β-hydroxy-17β-methoxy-4-oestrene.

References Cited
UNITED STATES PATENTS

| | | | |
|---|---|---|---|
| 3,164,617 | 1/1965 | Feather et al. | 260—397.4 |
| 3,328,434 | 6/1967 | Knox et al. | 260—397.4 |

OTHER REFERENCES

Djerassi, Steroid Reactions, 1963, pp. 135 and 146.

HENRY A. FRENCH, Primary Examiner

U.S. Cl. X.R.

260—397.4, 999